UNITED STATES PATENT OFFICE.

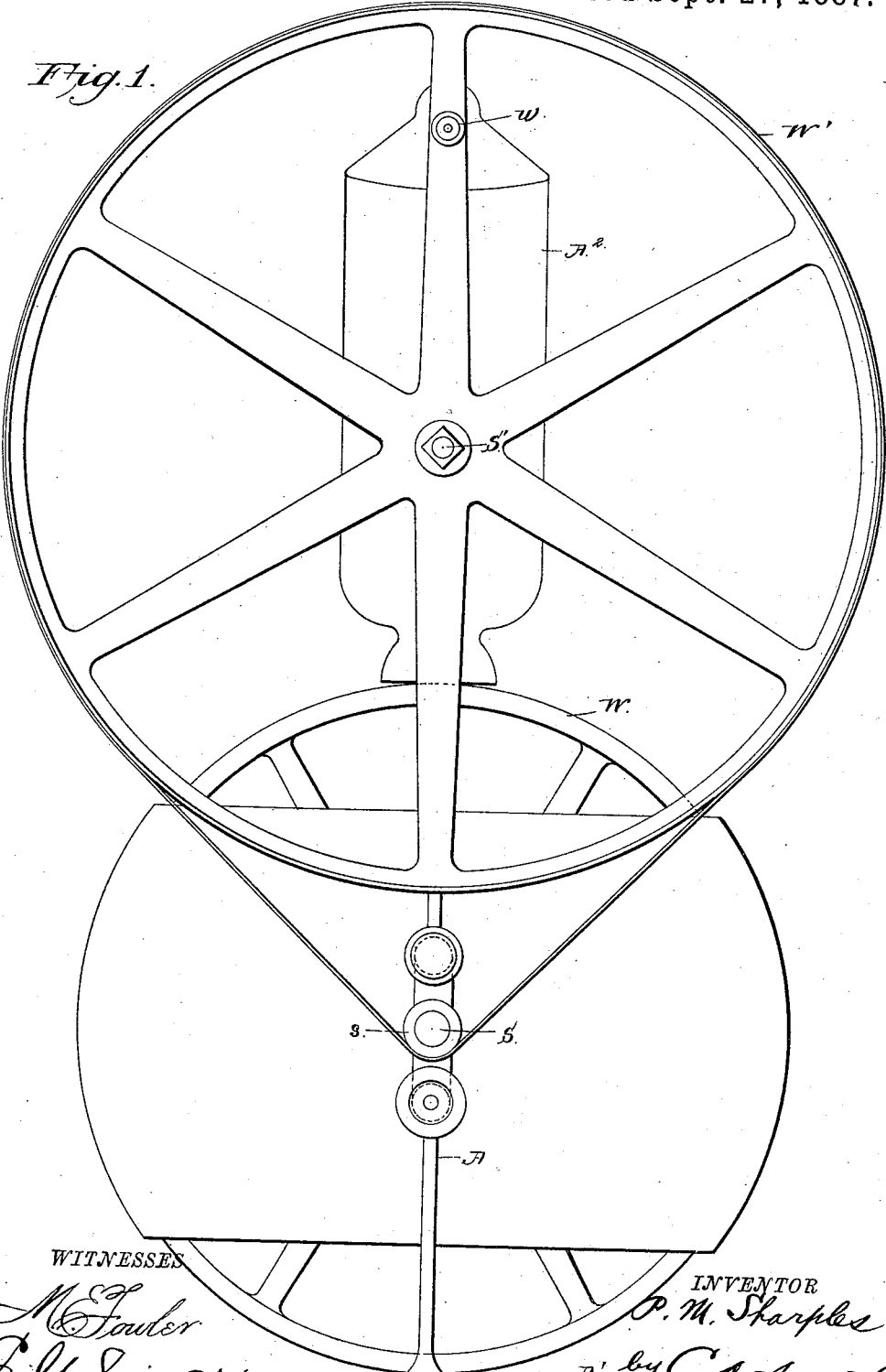

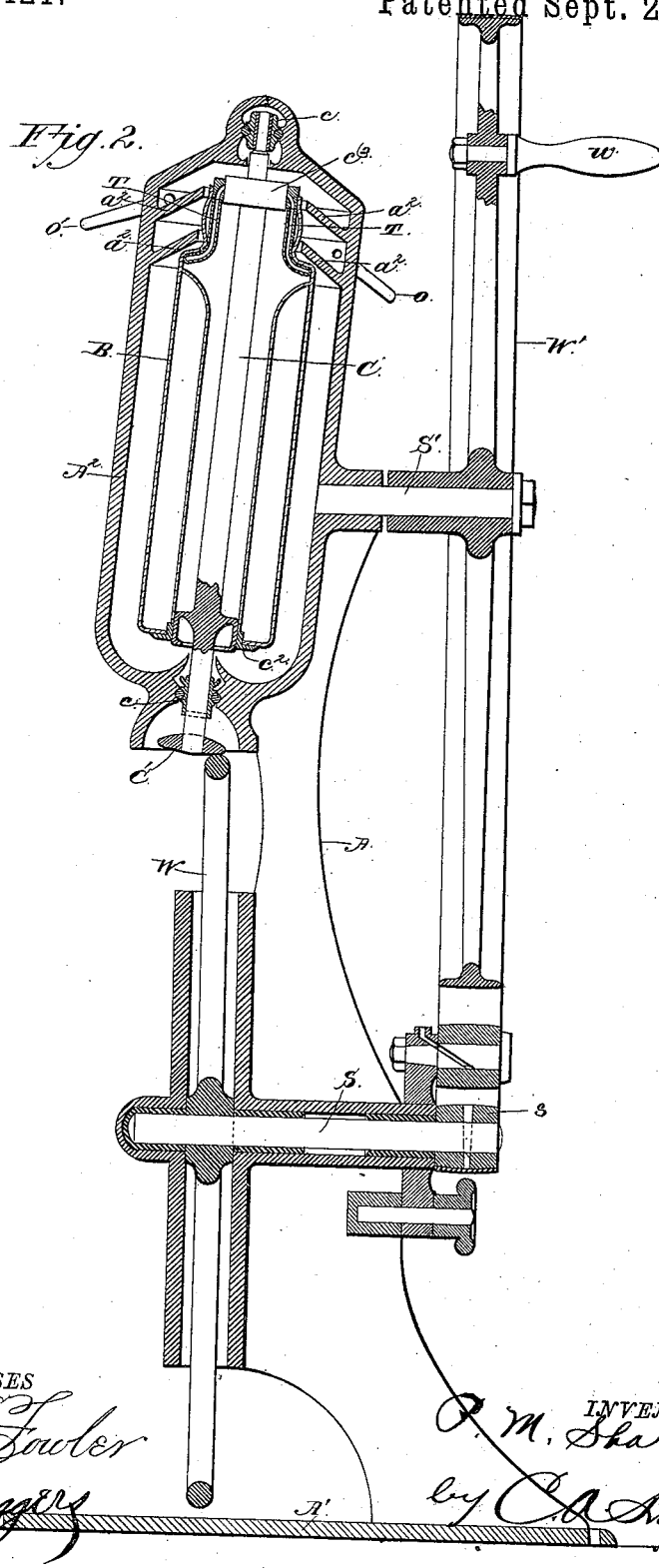

PHILIP M. SHARPLES, OF WEST CHESTER, PENNSYLVANIA.

MOTOR.

SPECIFICATION forming part of Letters Patent No. 370,421, dated September 27, 1887.

Application filed May 13, 1887. Serial No. 238,154. (No model.)

*To all whom it may concern:*

Be it known that I, PHILIP M. SHARPLES, a citizen of the United States, residing at West Chester, in the county of Chester and State of Pennsylvania, have invented a new and useful Improvement in Motors for Operating Cream-Separators, of which the following is a specification.

My invention relates to motors for centrifugally operating bowls or cylinders, and more particularly in connection with cream-separators; and it consists in the construction and arrangement of the parts of the same, as will be more fully hereinafter described, and pointed out in the claims.

The object of my invention is to provide a practical and compact apparatus for supporting and operating centrifugal bowls or cylinders, such as are used in cream-separators, emulsifiers, and the like, the arrangement being such as to enable very rapid rotary motion to be imparted to such machines, either by the turning of a handle at a moderate speed or from any comparatively slowly-revolving shaft, and that the vibration of the bowl or cylinder caused by its not being in perfect balance shall have a less deleterious effect, the result being a quieter, steadier motion than has heretofore been attained by other constructions. I attain this object by the mechanism illustrated in the accompanying drawings, wherein like letters of reference indicate similar parts in the several views, and in which—

Figure 1 is a front elevation of my improved apparatus. Fig. 2 is a transverse vertical section of the same.

A indicates the frame-work of the machine, which will be provided with a suitable base-plate, A', and a suitable chamber, A$^2$, in its upper portion for the reception and retention of the bowl or cylinder B. Through the chamber A$^2$ a shaft, C, passes, having bearings $c$ at both its upper and lower ends, and a steel disk or friction-plate, C', secured to its lower end. It will be understood that one portion of the chamber A$^2$ is adapted to be removed from or hinged on a portion thereof, which remains stationary in connection with the frame, for the purpose of permitting the bowl or jar B and the shaft C, which passes entirely through the said jar B, to be inserted therein.

To one portion of the shaft C a spider, $c^2$, is secured, upon which the lower portion of the jar B engages or rests, while at the other end of the same shaft a plate, $c^3$, is formed, which engages with the top of the said jar B.

T is the tube through which the new milk is admitted to the bowl B after the bowl is in motion, and on the internal portion of the chamber A$^2$ suitable rib projections, $a^2$, are formed at the upper portion thereof, which engage or pass around the upper portion or neck, as shown in Fig. 2, and receive the cream and skimmed milk as they pass from the bowl, and thence to the outlet-pipes O and O'.

In the lower portion of the frame A a shaft, S, is transversely mounted in suitable journal-boxes, and has a wheel, W, secured thereto, which is of considerable diametric cross-section, and whose periphery engages and passes across the under face of the steel disk C', mounted on the lower end of the shaft C. This wheel W passes between the two supporting-plates of the lower portion of the frame-work, and is snugly held therein by projections on each side of the hub thereof, which bear against the inner faces of the said lower frame-work, and thereby hold the wheel in its proper position. On the outer end of the shaft S a suitable pulley, $s$, is secured, which is adapted to revolve the shaft S by means of a belt which runs from the hand-operated belt-pulley W', situated above the said pulley $s$, and which has bearings on a stub-shaft, S', secured in the projecting portion of the chamber A$^2$, and which wheel W' is provided with an operating knob or handle, $w$. The wheel W' is considerably larger than the wheel $s$, and consequently causes a faster revolution of the wheel $s$ in view of its smaller construction, and this increased motion is thus translated to the wheel W, as will be readily understood. It will also be understood that suitable journal-boxes will be connected to the said shafts S and S'; and a belt-tightener may be used in connection with the pulley $s$, mounted on the outer end of the shaft S, for purposes which will be readily apparent.

As seen by Fig. 2 of the drawings, the shaft C, passing through the bowl or jar B, will be arranged at a slight inclination to the plane of the wheel W, so as to bring the center of gravity nearly or quite over the wheel W, as just set forth, and thus nearly or quite all of the weight of the bowl will bear directly on the wheel W in such a position as to bring a continuous frictional contact thereof to bear upon the outer periphery of the wheel W through the medium of the disk C'. The wheel W', being revolved by hand, as hereinbefore set forth, imparts motion through the medium of the belt encircling the same to the pulley secured to the outer end of the shaft S, and thence to the wheel W, which revolves at a faster rate of speed than the wheel W'. This wheel W imparts its motion to the disk C', which in turn revolves the shaft C at a very rapid rate of speed, due to the fact that the disk C' is of such small construction.

It will also be understood that if the rapidly-revolving bowl B should be in the slightest degree out of balance it will cause the vibration of the shaft C and disk C' in a direction at right angles to the axis of the shaft C, and that by my construction this motion or vibration would be across the face of the wheel W, in a line parallel, or approximately so, to the shaft S, and thus would obviate difficulties which would arise were the shafts C and S placed in such position with respect to each other as to cause the vibration of the shaft C and disk C' in a direction at right angles, or nearly so, to the vertical plane of the wheel W, which would produce an irregular movement, and consequently deteriorate from the steady revolution of the jar or bowl.

The novelty and utility of my device are apparent, and need not be further herein enlarged upon.

It is obvious that many minor variations in the construction and arrangement of the several parts—such as the substitution of cogs in place of the belt-wheels—may be made and substituted for those shown and described without departing from the nature and principle of my invention.

Having thus described my invention, I claim—

1. The combination of the shaft C, arranged at an angle of inclination and adapted to have a jar, B, mounted thereon, the disk C' on the lower end of said shaft, and the wheel W, having peripheral engagement with the face of said disk C', for imparting motion to the said shaft C, all arranged as and for the purpose described.

2. The combination of the shaft C, mounted at an angle of inclination and adapted to receive a jar or bowl, B, the disk C', mounted on the end of said shaft, the wheel W, the shaft S, upon which wheel W is mounted, and the mechanism, as set forth, for operating the said shaft S and wheel W, substantially as described.

In testimony that I claim the foregoing as my own I have hereto affixed my signature in presence of two witnesses.

PHILIP M. SHARPLES.

Witnesses:
E. G. SIGGERS,
MYRTLE STALNAKER.